United States Patent [19]

Megleo

[11] Patent Number: 5,798,129
[45] Date of Patent: Aug. 25, 1998

[54] DEVICE FOR PROTOTYPE MOLDING

[76] Inventor: Bruce A. Megleo, 730 S. Benton, Palatine, Ill. 60067

[21] Appl. No.: 522,195

[22] Filed: Aug. 31, 1995

[51] Int. Cl.$^6$ .................................................. B29C 33/20
[52] U.S. Cl. .......................... 425/215; 249/168; 425/546; 425/451.9; 425/DIG. 44
[58] Field of Search .................. 425/179, 546, 425/215, 451.9, DIG. 44; 249/134, 160, 168

[56] References Cited

U.S. PATENT DOCUMENTS

| | | | |
|---|---|---|---|
| 2,397,168 | 3/1946 | Touceda | 425/179 |
| 3,813,201 | 5/1974 | Frederick et al. | 425/DIG. 44 |
| 3,907,245 | 9/1975 | Linder | 249/168 |
| 3,997,256 | 12/1976 | Wells | 353/27 A |
| 4,157,805 | 6/1979 | Haber et al. | 249/168 |
| 4,265,850 | 5/1981 | Coulon et al. | 249/168 |
| 4,824,628 | 4/1989 | Curfman | 425/179 |
| 5,033,947 | 7/1991 | Zanetos et al. | 249/168 |
| 5,275,545 | 1/1994 | Ohyanagi et al. | 425/73 |
| 5,620,720 | 4/1997 | Glick et al. | 249/168 |

OTHER PUBLICATIONS

Dow Corning, "New Product Information" or Silastic® T RTV Silicone Rubber (1992).
Dow Corning "Information About High Technology Products" on Silastic® T RTV Silicone Rubber (1991).
Ciba–Geigy "Provisional Data Sheet" on TDT 178–59–1 Resin/TDT 178–80 Hardener Fast Curing Prototype System, Polyurethane For Hand Mixing, pp. 1 and 2.

Primary Examiner—James P. Mackey
Attorney, Agent, or Firm—Donald J. Pochopien; McAndrews, Held & Malloy, Ltd.

[57] ABSTRACT

The present invention is directed to a resilient and self-locking mold for the prototype molding of an object using a liquid resin, the mold comprising first and second mold portions matable to form a mold of the object, the first mold portion having a first opposing mold face with a cavity therein corresponding to the size and shape of the object to be molded, the second mold portion having a second opposing mold face with a core thereon corresponding to the back of the object to be molded, the opposing mold faces of the first mold portion and the second mold portion, upon mating, defining a void therebetween, the void corresponding in size, shape and thickness, to the object to be molded, the void further having a first orifice for providing resin therein, a second orifice for removing air therefrom, the first mold portion and second mold portion further having opposing members of a resilient interlocking pair on the opposing mold faces, the interlocking pair members when interlocked, providing a resilient and self-locking mold having a void that is resistant to air seepage during molding conditions and upon the void being filled with liquid resin, is capable of holding the first and second mold portions together without external compression until the liquid resin hardens into the object. In addition, the present invention is directed to a method for the rapid prototype molding of a resinous object using the above described resilient and self-locking mold.

12 Claims, 3 Drawing Sheets

DEVICE FOR PROTOTYPE MOLDING

BACKGROUND

A. Field of the Invention

The present invention relates to an improved mold, device and method for the prototype molding of an object in resin under reduced pressure. The method of the present invention uses the Applicant's improved resilient and self-locking mold. The present mold, device and method are useful because they increase the throughput, and thus the productivity of prototype molding.

B. Background of the Invention

Designers of bottles, durable goods, electronics and other equipment will make one or more prototypes of their equipment at great expense. Often to determine whether the housing and overall appearance of the design is aesthetically and/or functionally acceptable, a manufacturer will go to a prototype molder and request that he exactly duplicate the shape and exterior intricacies of a prototype device or housing using a plastic resin. Prototype orders may range from five to several hundred parts, depending upon the market and the size of the corporation. Because such orders are small, the manufacturing of such prototypes cannot justify the expense associated with preparing machined multi-dye molds, such as are used to mass produce commodity type items, e.g., o-rings, toys, plastic parts, and plastic housings on a commercial scale.

In prototype molding, the prototype molder upon receiving a part to be duplicated, will prepare a silicone mold of the part. To prepare the silicone mold, the part to be molded is mounted to a board. The necessary partings are added to bring any low edge(s) of the part up to the highest edge. A small parting corresponding to a reservoir (i.e., overflow chamber) is added to the mold to provide a volume for receiving any excess resin. A parting is also added to provide an appropriate gate and channel for directing the liquid resin to the void formed by the part. The partings and the mounted part are coated with a mold release agent. A liquid silicone resin is then poured up to the top of the mold base, and allowed to cure. The partings are removed from the mold. Typically, vents are added to the deep parts of the mold. After coating the first half of the mold and the model with a releasing agent, the second half of the mold is poured. When the silicone is cured, the mold halves are separated and the part is removed. A hole is cut to the overflow chamber, and a two piece mold having a cavity section and a core section is ready to use.

In conventional prototype molding, the above described mold halves are combined face-to-face and placed in a compression box. The compression box, when clamped, compresses and retains the mold halves in their face-to-face configuration. In this configuration, the mold halves form a void having the size and shape of the object to be molded. A polymeric resin is poured into the void of the above-described silicone mold and allowed to displace the air therein by gravity. To minimize trapping air bubbles, which would appear as defects in the molded object, the void in the mold may optionally contain one or more vents to the outside. To further minimize the appearance of air bubbles in the molded part, the mold with liquid resin therein is placed into a pressure tank which is then pressurized with air at seventy pounds per square inch (p.s.i.) for about six hours. The higher pressure in the tank compresses any entrapped bubbles and minimizes their size to an acceptable level. Because the entrapped air bubbles are pressurized, the mold cannot be removed from the pressure tank until the resin has completely set. Premature removal of the mold from the pressure tank, after the resin sets, but before it is fully hardened, would allow any entrapped bubbles to re-expand, possibly damaging the appearance of the final product. Using this conventional method, many prototype molders are only able to produce two to three parts per day per mold. As a result, customers typically order ten parts or less because it takes weeks to produce larger orders.

Recently, a method was devised to increase the throughput in prototype molding to about 20–30 parts/day/mold, employing the device 10 of FIG. 1. In this method, a two piece silicone mold having a cavity half 16, a core half 17, a resin injection site 15 and a vent 9 are placed in opposing halves 6 and 7 of a two piece aluminum box defining a cavity therein of sufficient size to accommodate the mold. The aluminum box has holes corresponding to an injection site 18 and a vent site 9 on the mold. Opposing sides of the aluminum box have hand operated screw clamps (not shown) that are capable of adjustably clamping the box halves together and providing a means for adjustably compressing the silicone mold halves. The clamped aluminum box halves 6 and 7 with the mold halves 16 and 17 therein, i.e., the aluminum box-mold combination, is placed into a vacuum chamber 1 having a lid 2 which opens from the top via a hinge 3 as shown in FIG. 1. The hinged lid 1 has a hole 4 of sufficient diameter to accommodate, preferably with sealing, a long fill line 5 that passes through a hole 18 in the top box half 6 to securely connect to a hole (not shown) in the top mold half 16. During the initial stages of the process, the hole 4 in hinged lid 1 is preferably sealed with a removable cork or rubber stopper (not shown). Once the lid 2 of the vacuum chamber 1 is sealed, a vacuum (20–30 inches of mercury) is pulled on the chamber. The air in the sealed vacuum chamber is then evacuated via a vacuum line attached to a nozzle 8. The position of nozzle 8 is of little importance. However, it is preferably not placed directly underneath aluminum mold box 6–7, since this would slow the evacuation of air from the vacuum chamber. As air evacuates the vacuum chamber, via nozzle 8, it simultaneously bleeds out of the cavities in the sealed mold via vent 9. Once a light vacuum has been pulled, the cork (not shown) is removed from hole 4 and the fill line 5 is inserted through hole 4 and into the top box half 6. After the pressure in the vacuum chamber is again reduced, an appropriate volume of resin is injected into the evacuated mold via fill line 5. Thereafter, the vacuum is removed, the fill line 5 is removed from the mold, the lid 2 is opened, and the clamped aluminum box 6–7, containing mold halves 16 and 17 therein, is removed intact from the vacuum box 1 and placed to the side to allow the resin in the mold to set. The process is repeated using a second aluminum box containing a second mold. Once the second aluminum box has completed its first cycle, the first aluminum box is unclamped, and the first silicone mold is removed from the box. When the newly molded part is removed from the first silicone mold, the first silicone mold is capable of being reinserted and reclamped in the first aluminum box to repeat the cycle.

Although the above described vacuum assist method increases the throughput of prototype molding relative to the conventional method, the above described vacuum assist method suffers from many infirmities that preclude the throughput of the process from being increased further. In particular, the lid 2 of the vacuum chamber 1 weighs about thirty pounds and opening and closing it during the course of a day is both fatiguing and time consuming. In addition, the handling of the large aluminum box-mold combination which sometimes can weight up to 50–60 lbs, such as by inserting it into and removing it from the vacuum chamber of FIG. 1, is also fatiguing and labor intensive. Accordingly, one object of the present invention is to eliminate these fatiguing and time consuming activities in prototype molding. In addition, time is required to reduce the air pressure in the vacuum chamber to a molding pressure. This step also slows productivity. Accordingly, it is also an object of the present invention to speed up the vacuum step. Also, in the above described vacuum assist method, the aluminum box encasing the mold must be manually clamped together prior to molding and physically unclamped after molding. This step is also time consuming and labor intensive. Accordingly, it is a further object of the present invention to overcome this labor intensive and time consuming problem.

Thus, although the above described vacuum assist method for prototype molding allows for increased throughput compared to the conventional method, it is an object of the present invention to further increase the throughput of prototype molding.

SUMMARY OF THE INVENTION

The present invention is directed to an improved resilient and self-locking mold that facilitates throughput in prototype molding and to an improved process for prototype molding using the improved resilient and self-locking mold of the present invention. The process of the present invention eliminates many of the labor intensive and slow steps associated with the devices and the processes of the prior art.

In particular, the present invention is directed to a resilient and self-locking mold for the prototype molding of an object using a liquid resin, the mold comprising first and second resilient mold portions matable to form a mold of the object to be molded. The first mold portion has a first opposing mold face having a cavity therein corresponding to the shape of the object to be molded. The second mold portion has a second opposing mold face having a core thereon corresponding to the back of the object to be molded. The first mold portion and the second mold portion, upon mating, define a void therebetween, the void corresponding in size and shape to the object to be molded. The void is connected by a first channel to a first orifice on the outer surface of the mold, the first channel and first orifice being of sufficient size for providing resin to the void. The void is further associated with a second channel extending from the void to a second orifice on an outer surface of the mold, with the second channel and second orifice being of sufficient size for removing air from the void. The first mold portion and the second mold portion also have opposing members of a resilient interlocking pair on opposing mold faces, respectively. The interlocking pair members, when interlocked, form a resilient and self-locking mold having a void that is resistant to air seepage during molding conditions, and when the void is filled with liquid resin, the interlocked pair members are capable of holding the first and second mold portions together without external compression until the liquid resin in the void hardens into the object to be molded.

In addition, the present invention is directed to a method for the rapid prototype molding of resinous objects using the above disclosed mold. In particular, the method of the present invention comprises the steps of:

a. securing the above described mold by compressing the first mold portion against the second mold portion at a predetermined pressure;

b. reducing the air pressure in the void of the secured mold by applying a vacuum line directly to an orifice on the mold's surface;

c. while the void is under reduced pressure, introducing a quantity of liquid resin into the void of the mold through a second orifice that is on the surface of the mold, the quantity of liquid resin introduced being at least sufficient to fill the void;

d. removing the external compression, the vacuum line, and the resin line from the mold containing the liquid resin; and e. allowing the liquid resin in the void of the mold of Step (d) to harden into the resinous object, the liquid resin in said void capable of hardening to form said molded object in the absence of external compression on the mold.

The above described method is capable of being performed with a single mold and a single piston driven platen, or in a semi-automated fashion, such as with a turntable feeding empty molds and removing filled molds from the platen site.

DETAILED DESCRIPTION OF THE INVENTION

Figure 1:
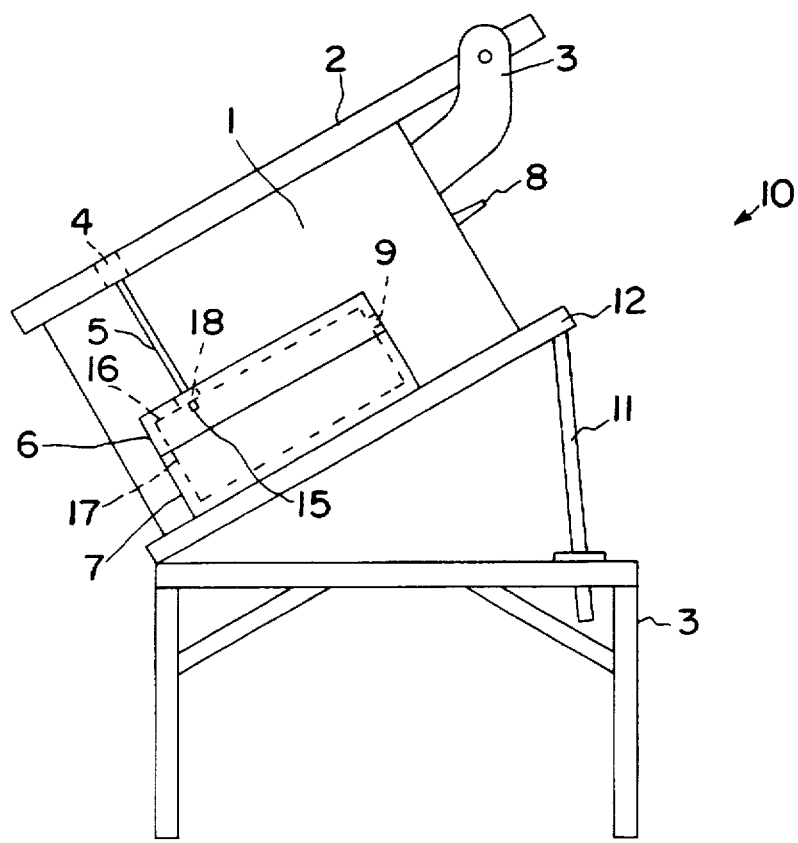
FIG. 1 is directed to the device used in the prior art vacuum assist method of prototype molding.

The present invention has multiple aspects. In its first aspect, it is directed to a resilient and self-locking mold for the prototype molding of an object using a liquid resin.

In particular, the resilient and self-locking mold of the present invention comprises a first resilient mold portion and a second resilient mold portion having opposing mold faces that are matable to form a mold of the object. The first mold portion has a first opposing mold face with a cavity therein corresponding to the front side of the object to be molded. The second mold portion has a second opposing mold face with a core therein corresponding to the back of the object to be molded. The first mold portion and the second mold portion, upon mating, define a void therebetween, the void corresponding in size and shape to the object to be molded. The void is connected by a first channel to a first orifice on an outer surface of the mold that is of suitable size and position to allow the filling of the void with a liquid resin. The void is further associated with a second channel extending from the void to a second orifice on an outer surface of the mold, the channel and orifice being of sufficient size and position to remove air from the void and to facilitate the filling of the void with resin in a substantially air free manner. The first mold portion and the second mold portion have opposing members of a resilient interlocking pair on opposing mold faces, respectively. The interlocking pair members, when interlocked, form a self-locking mold having a void that is resistant to air seepage during molding conditions, and when the void is filled with liquid resin, are capable of holding the first and second opposing mold faces together without the application of external compression until the liquid resin in the void hardens (i.e., sets) into the object to be molded.

In the mold of the present invention, the first resilient mold portion and the second resilient mold portion are made of a resilient polymeric material. Suitable resilient polymeric materials include silicone rubbers and the like. A preferred class of materials are the two-part silicone rubbers such as Silastic® T RTV and Silastic® M RTV, which are commercially available from Dow Corning Corporation, Midland, Mich. A particularly preferred silicone rubber is Silastic® M RTV.

In the resilient and interlocking mold of the present invention, the first and second resilient mold portions have a first opposing mold face and a second opposing mold face, respectively, wherein each opposing mold face has thereon an opposing member of a resilient interlocking pair. Upon interlocking, the interlocking pair performs at least two functions. As its first function, the interlocking pair renders the void resistant to air seepage when air in the void is subjected to reduced pressure, such as by the partial evacuation of the air in the void with a vacuum pump. This function is the result of the increased distance that any air from the exterior would have to travel along the interface of the opposing mold faces before reaching the void. More importantly, for enhancing the throughput of prototype molding, the interlocking pair performs a second function. When the interlocking pair members are interlocked, they function to provide a resilient and self-locking mold that is capable of being removed from the prototype molding apparatus almost immediately after being filled with resin without the need to apply external compression to the opposing mold portions. Because of the present mold's interlocking feature, the mold, after being filled, is capable of being removed from the mold housing (i.e., mold box) of the filling device and set aside without the prior art need to apply external compression until the setting of the liquid resin therein. However, for large parts, such as a chair, it is preferable to retain the mold for 15–20 minutes in the mold box used during the air evacuating and filling steps. Accordingly, the self-locking and resilient mold of the present invention eliminates the prior art's need for the clamped aluminum mold box and for maintaining external compression on the opposing mold portions for a substantial period of time (e.g., 15 minutes) after the air evacuation and the resin filling of the void. Because the interlocking pair members are resilient, they also function to releasably provide the molded object when pried apart.

In the mold of the present invention, the resilient interlocking pair comprise a male and a female member that are on opposing mold faces of the first mold portion and the second mold portion, respectively. In one embodiment, the male member, which projects from the mold face, is made by adhering a male member to the mold face. Preferably, the male member is made of the same resilient material as the mold portion from which it projects. In another embodiment, a first mold portion having the female member of the interlocking pair is produced first. The male member is made therefrom by casting a second mold portion using the first mold portion and its female member as the template. Using this latter embodiment, a mold portion having the male member of the interlocking pair is capable of being produced in a complementary size and shape to the mold portion having the female member of the interlocking pair.

A preferred interlocking pair comprises a resilient ring and a recess of sufficient size and shape in a resilient mold portion to snugly and reversibly receive the ring. In this preferred embodiment, the ring circumscribes the cavity if it is on the first mold portion, or it circumscribes the core if it is on the second mold portion. As used herein, the term "ring" is not limited to being a circular member around the cavity or core, but is intended to encompass any shape that is capable of surrounding the cavity or the core on one of the opposing mold faces. In most instances, the shape of the ring will be dictated in part by the shape of the object to be molded.

The cross-sectional shape of the ring may vary. Examples of suitable cross-sectional shapes for the ring include a circle (FIG. 3), an ellipse, an oval, an octagon, a hexagon, a pentagon, a triangle on point or a diamond on point and the like, or combinations thereof. A preferred interlock between the ring and the corresponding recess occurs when the ring is attached to the mold face along its length via a neck (the "neck" being an elongated portion of the ring that is adjacent the mold face). (See FIG. 3) The cross-sectional width of the neck is narrower than the widest cross-sectional width of the ring.

To make a first mold portion and a second mold portion having opposing mold faces with opposing interlocking members that are integral thereto, one would begin in the conventional manner by mounting the object (e.g., a front half of a beeper housing) to a board and building the partings necessary to raise any lower edges to the level of the highest edge. Thereafter, around the periphery of the mounted object, a member of the interlocking pair, such as a flexible tube having the shape of the male member of the interlocking pair, is mounted, preferably on a neck, to create a template for the recess member of the interlocking pair. One also adds a first orifice and a line connecting to the mounted object to provide an orifice and a channel for introducing liquid resin into the void corresponding to the object to be molded. One also introduces a second orifice and a second line connecting to the mounted object that upon being removed, provides the mold portion with a second orifice and a second channel of sufficient size for removing air. A mold release agent is sprayed on all surfaces of the mounted part and partings. Thereafter, a mold box half, which has been sprayed with a mold release agent, is placed over the mounted and parted object. A suitable silicone resin then is poured into the box with the mounted object and allowed to cure. Upon curing, the first mold portion is loosened from the first mold box to form a first mold portion having a cavity and a female member of an interlocking pair thereon. The second mold portion is then made as described in Example 1.

The resilient and interlocking mold of the present invention is suitable for molding objects using one of a variety of liquid resins known to the prototype molding art. Typically, the molding resin is a two-part polyurethane or a polyurethane blend. By way of example, one such polyurethane resin is REN® TDT 178-59-1R/TDT 178,80H, which is commercially available from Ciba Geigy Corporation. Other such molding resins are the Ultralloy™ 900 Series Liquid (Silicone) Molding Compounds which are commercially available from Hapco Inc., Hanover, Md.

In its second aspect, the present invention is directed to a device that facilitates the prototype molding of an object using the mold of the present invention. In particular, the device of the present invention comprises a seat capable of providing lateral and horizontal support to the resilient and self-locking mold of the present invention. The device further comprises a pressure driven platen. The platen is positioned opposite the lateral support and capable of exerting a predetermined amount of compression in the direction of the lateral support. The space between the lateral support and platen is of sufficient size for receiving a mold of the present invention.

In operation, a resilient and self-locking mold of the present invention, which preferably has its first and second mold portions interlocked, is placed in one of the halves of a mold box, (typically, an aluminum mold box), each mold box half being secured to an opposing platen. A resin dispensing line is connected to an orifice on the mold's surface, which is connected, via a channel to the mold cavity. A vacuum line is connected to the second orifice on the mold's surface, which is connected to the mold cavity. The platen is activated and it moves toward the opposing platen, compressing the face of the first mold member against the opposing face of the second mold member. The compressed mold is thereby secured for the resin injection step.

It is preferred that the platen be capable of delivering a predetermined amount of pressure to the mold portion. Preferably, the platen is driven by air or hydraulic pressure. After the mold is secured between the platen and the lateral support, the void of the mold is evacuated of air, via the vacuum line, and a predetermined amount of liquid resin is forced into the evacuated mold. Once the void is filled with liquid resin, the vacuum line and fill lines are removed and the platen deactivated. The unsecured mold is now capable of being placed to the side to allow the liquid resin therein to harden. The above process is then repeated using a second mold.

In an alternative embodiment, the same device can be used to secure in a (sandwich-wise) manner, two or more molds between the platen and the lateral support, applying the same amount of pressure to each. In this embodiment, the void of each mold in the series is evacuated of air and filled with resin before proceeding to the next mold. Once the void of each mold in the series has been evacuated and filled, the platen is deactivated, the series of molds are removed from the device and the liquid resin in each is allowed to harden into the object to be molded without further need for external compression. This latter embodiment increases throughput even more than the prior embodiment because it eliminates the multiple steps associated with activating and deactivating the platen and the multiple handlings of each individual mold.

In yet another embodiment, a turntable may be used to feed empty molds to and remove filled molds from the resin filling site having the above described pressure driven platen.

Thus, the above methods are characterized in that they eliminate the need for the vacuum box of the prior art. This is useful because it eliminates steps of opening and closing of the vacuum box, which are both fatiguing and time consuming. The above methods also increase throughput by eliminating the need to evacuate the entire vacuum box in order to evacuate the void in the mold. Further, the above methods are characterized in that they also eliminate the need for the hand operated clamps for adjusting compression of the mold portions.

In either of the above embodiments, the compression provided by the platen is provided by hydraulic or air pressure. Preferably, the compression force is provided by air pressure. More preferably, the air pressure is capable of being regulated to a predetermined amount. The amount of compression that is to be applied in any instance must be sufficient to prevent any of the liquid resin that is injected into the void from squeezing out between the opposing faces of the mold portions. By controlling the mold compression pressure, and by adding a vacuum chamber outside the void to receive any excess resin, the escape of resin between opposing mold faces is minimized. Typical compression pressures are from 50 to 60 pounds per square inch (p.s.i.).

The vacuum pressures used in the above embodiments should not be so strong as to pull resin into the vacuum line during filling. Suitable vacuum pressure for use in the present invention varies depending upon the volume of the void, and the channel size through which the air travels from the void to the vacuum. Those skilled in the art of vacuum assist prototype molding can readily determine the vacuum pressures to be used. Typically, suitable vacuum pressures range from 20 inches to 30 inches of mercury, preferably 26 to 30 inches. Typical channel sizes are from 0.125" to 0.250".

Thus, in its third aspect, the present invention is also directed to an improved method for the prototype molding of a resin-based object. In particular, the method of the present invention comprises the steps of:

a. securing the above described mold by compressing the first mold portion against the second mold portion at a predetermined pressure;

b. reducing the air pressure in the void of the secured mold by applying a vacuum line directly to an orifice on the mold's surface;

c. while the void is under reduced pressure, introducing a quantity of liquid resin into the void of the mold through a second orifice that is on the surface of the mold, the quantity of liquid resin being at least sufficient to fill the void;

d. removing the external compression, the vacuum line, and the resin line from the mold containing the liquid resin; and e. allowing the liquid resin in the void of the mold to harden into the resinous object, the liquid resin capable of hardening in said mold to form the molded object in the absence of external compression on the mold.

Figure 2:
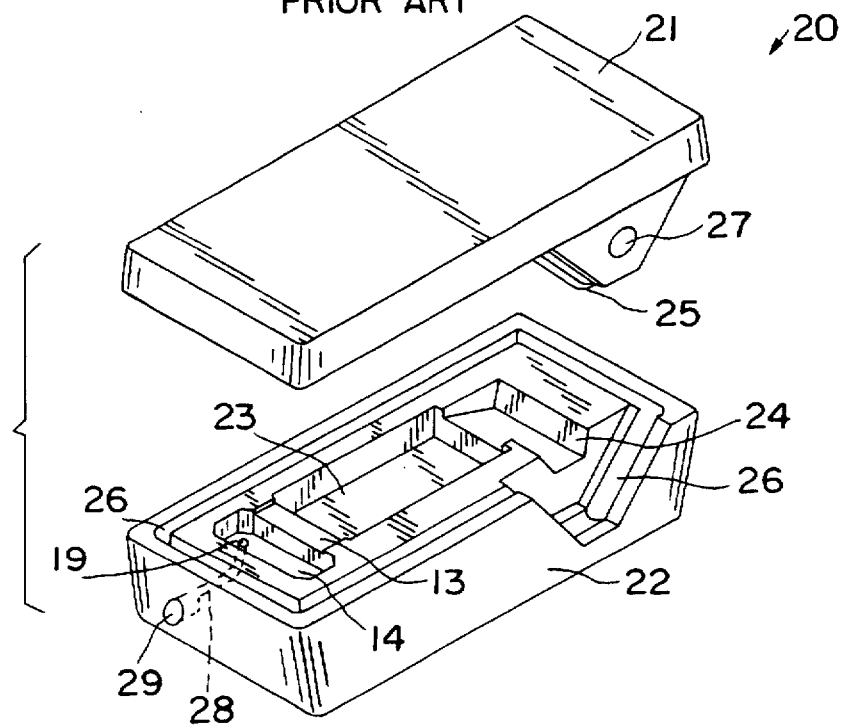
FIG. 2 is directed to an exploded view of an embodiment of a two piece resilient and self-locking mold of the present invention having an interlocking ring and a corresponding recess circumscribing the cavity and the core on opposing mold faces, respectively.
Figure 3:
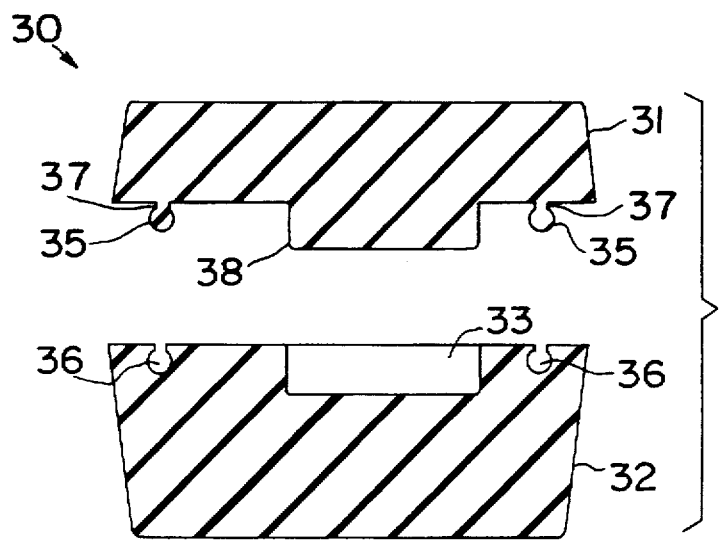
FIG. 3 is a cross-sectional view of the embodiment of the resilient and self-locking mold of FIG. 2, wherein opposing mold portions are shown as separated and the interlocking ring and corresponding recess are shown as circumscribing the mold cavity.

Consistent with the above disclosure, FIGS. 2 and 3 provide differing views of an embodiment of the present invention. In particular, FIG. 2 depicts an exploded view of a two piece mold 20 of the present invention having mold halves 21 and 22 that are circumscribed by an interlocking ring 25 and recess 26, respectively. The recess 26 is shown as surrounding the cavity (void) 23 that is in the shape of the object to be molded. The mold half 21 has an injection port 27 that is of sufficient size to receive a nozzle capable of injecting a moldable resin therein. When the mold halves 21 and 22 are compressed together, such that the ring 25 and the corresponding recess 26 interlock, the injection port 27 is connected to vent hole 29, via a series of open spaces 24, 23, 13 and 14, a hole 19 and a channel 28. Space 24, which is connected to hole 27 disperses injected resin across the width of the mold cavity 23, which mold cavity with the core (not shown in mold half 21) defines the shape of the object to be molded. Overflow slot 13 is a narrow slot that is capable of receiving excess resin from the mold cavity 23 and directing its flow to overflow chamber 14. Overflow chamber 14 has a hole 19, which is connected via channel 28, to a vent hole 29 on the exterior of the mold half 22. The vent hole 29 is of suitable size for connecting to a vacuum line (not shown). Because vent hole 29 is ultimately connected to injection port 27, when the injection port is connected to a resin dispensing line and when a vacuum is applied across vent hole 29, the air in the space defined by elements 28, 14, 13, 23, and 24 is evacuated.

FIG. 3 is an exploded and cross-sectional view of a two piece mold 30, such as shown in FIG. 2. FIG. 3 shows mold halves 31 and 32, respectively, having a circumscribing ring 35 and a corresponding recess 36 for receiving the circumscribing ring so as to form an interlocking pair. In FIG. 3, the circumscribing ring 35 is shown as being connected to the body of mold half 31, via a neck 37. Additional features shown in FIG. 3 are the mold cavity 33 and the mold core 38, which when mold halves 31 and 32 are interlocked, define a cavity in the shape of the object to be molded.

Figure 4:
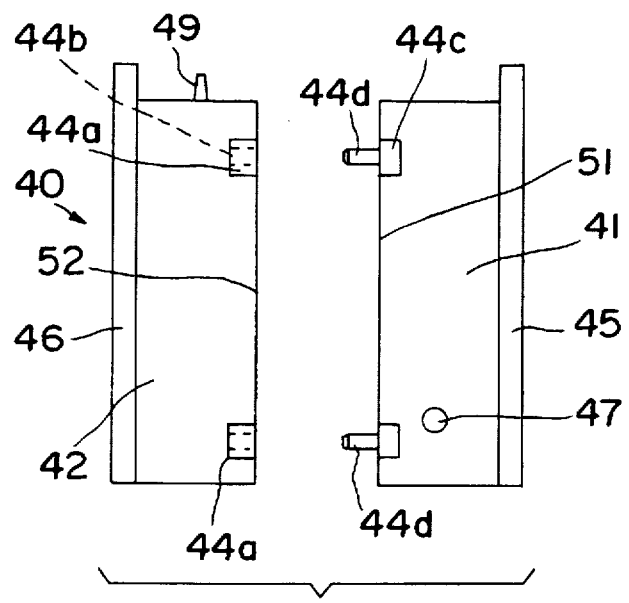
FIG. 4 shows an exploded side view of an embodiment of a two piece mold box suitable for use with the interlocking mold of FIGS. 2 and 3 of the present invention. In the embodiment shown, the mold box has a series of positioning pins and receiving holes on opposing mold box halves.

FIG. 4 depicts an exploded side view of a two piece mold box 40, preferably aluminum, for encasing a two piece mold 20 of the present invention, such as the mold of FIGS. 2 and 3. The mold box 40 has two mold halves 41 and 42, which when compressed together define a space therebetween that is suited for holding and compressing the mold halves 21 and 22 of FIG. 2 together. Mold box half 41 has a hole 47 in its side face that is capable of providing access to injection port 27 when mold half 21 of FIG. 2 is placed therein. Mold box half 42 has a nozzle 49 on its top face that is capable of providing access to vent hole 29, when mold half 22 of FIG. 2 is therein. Mold box halves 41 and 42 have plates 45 and 46, respectively which are affixed or integrally attached to the back of each mold half. These plates allow the mold halves 41 and 42 to be clamped or affixed to opposing platens. To provide for a quick and proper alignment when mold box halves 41 and 42 are compressed together, mold box halves 41 and 42 each have wings 44c and 44b, respectively projecting from their respective side faces. These wings are in pairs on both side faces and are associated with male 44d and female 44b positioning members.

Figure 5:
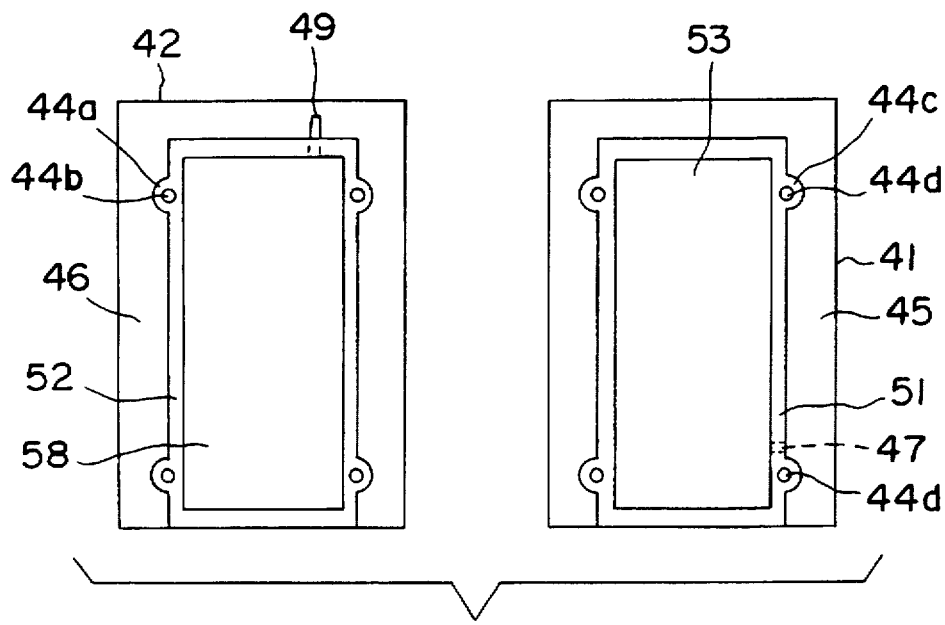
FIG. 5 shows a view of the open faces of the two mold box halves of FIG. 4.

FIG. 5 provides a second perspective of these positioning members. FIG. 5 is an exploded view of the mold box of FIG. 4 wherein the mold box halves 41 and 42 of FIG. 4 are positioned such that their mating faces 51 and 52, respectively face the viewer. FIG. 5 reflects that mold half 42 has four wings 44a having female positioning members 44b thereon that are in receiving relationship for the four male positioning members 44d which are on the four wings 44c of mold half 41. Cavity 53 in mold box half 41 and cavity 58 in mold box half 42 are capable of receiving mold halves 21 and 22 of FIG. 2, respectively.

Figure 6:
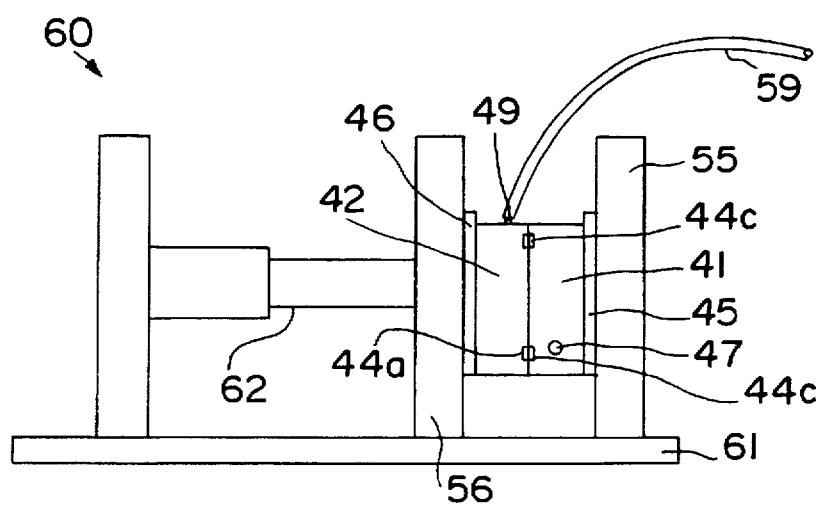
FIG. 6 shows one embodiment of a pressure driven device for use in securing the resilient and self-locking mold of the present invention during air evacuation and resin-filling of the mold cavity.

FIG. 6 shows a device 60 for use in practicing an embodiment of the method of the present invention. This device 60 employs the mold box halves 41 and 42 (of FIGS. 4 and 5) which are mounted, via plates 45 and 46, respectively, on opposing platens 55 and 56, respectively. Platen 56 is driven by a piston 62, which piston preferably is controlled by air pressure. Opposing platen 55 is fixed to table 61. In practice, the mold halves of the present invention (e.g., 21 and 22 of FIG. 2) are placed in mold box halves 41 and 42, respectively. The mold halves may be interlocked to one another prior to placement in the mold box halves. Alternatively, the mold halves 21 and 22 may be placed in their respective mold box halves 41 and 42, which are then compressed together by piston 62, causing the mold halves to interlock. In practice, the interlocked mold halves are compressed together at a predetermined pressure, typically 50–60 psi. A vacuum line 59 is attached to a vacuum nozzle 49 for evacuating air from the mold cavity (not shown). A nozzle (not shown), such as from a static mixer, is used for injecting a liquid resin into hole 47. After the vacuum has evacuated air from the mold cavity (not shown), an amount of liquid resin sufficient to fill the mold cavity is injected via hole 47. After injection, the injection line (not shown) and vacuum line 59 are removed from the mold. The piston 62 is then drawn back (to the left) separating mold box halves 41 and 42 and exposing the resilient and self-locking mold of the present invention which is filled with liquid resin. The exposed and interlocked mold containing the liquid resin then is completely withdrawn from the remaining mold half and placed to the side until the liquid resin sets. While the resin is setting, a second resilient and self locking mold of the present invention is capable of being inserted into the mold box and the process repeated.

EXAMPLE 1

Making A Resilient and Self-Locking Mold For A Beeper Sized Housing

A two piece resilient and self-locking mold of the present invention was made to duplicate a model of a beeper-sized housing half shell. To make the female half of the two piece mold, the model half shell was mounted to a board and partings were added to eliminate as many undercuts as possible. Gating (i.e., a hole and channel) for resin entry was added. A circular tube corresponding to a male member of the interlocking pair was added, circumscribing the object to be molded. Shapes corresponding to the vacuum chamber and the overflow chamber were then added. Thereafter, a conventional mold release agent was sprayed over the entire parting and an aluminum mold box half. The sprayed mold box half was placed over the mounted, parted and sprayed model and a two part silicone molding composition, i.e., Silastic® M RTV (Dow Corning), which was formulated according to the manufacturer's instructions, was poured into the mold box half. The silicone was allowed to cure for eight hours.

After the silicone cured, the aluminum box containing the silicone was separated from the parting. The model, the gating, and the male member of the interlocking pair remain behind. Thereafter, all partings and the male member of the interlocking pair were removed. The female portion of the mold was examined and cleaned where necessary. A vacuum vent, with a channel connecting to the overflow chamber was added. Gating was then added and the cores corresponding to the shapes of the vacuum chamber and the overflow were allowed to remain. A mold release agent was sprayed into a second mold box and over the entire face of the first mold half with partings, gating and chambers. A second aluminum mold box was placed over the partings and the female portion of the mold. A silicone resin was then poured into the second mold half through a hole therein. The resin was allowed to cure for eight hours. After curing, the aluminum mold box halves were pulled apart, and all gating, parting chambers and the model were removed. The resulting embodiment of a two piece and self locking mold of the present invention was now ready for use.

EXAMPLE 2

Making Of A Beeper Sized Housing Using The Resilient and Self-Locking Mold Of EXAMPLE 1

A mold release agent was sprayed on the opposing mold faces of the two mold halves that were made in Example 1.

The mold halves were placed in an aluminum mold box (i.e., the aluminum boxes that were used in Example 1) and their opposing faces compressed together. A vacuum line was connected to the vacuum vent. A static mixer for dispensing a molding resin was connected to the injection port. After the mold cavity was evacuated of air (about ten seconds), an effective amount of the molding resin, TDT-59-1 Resin/TDT 178-80 Hardener, which is commercially available from Ciba Geigy, was dispensed into the mold cavity. The vacuum line was turned off and resin dispensing lines were then removed. The two piece self-locking mold, while still interlocked was removed from the aluminum mold box and set aside about fifteen minutes for curing. After the part was cured, the silicone mold halves were pulled apart and this newly molded part stuck to the female half of the mold. Pressure from an air hose was used to blow the new part out of the female half of the mold. The gates and vents were cleaned from the part producing a perfect duplicate of the original model of a beeper sized housing half-shell.

What is claimed is:

1. A reusable, resilient and self-locking mold for the prototype molding of an object, said mold comprising a first resilient mold portion and a second resilient mold portion matable thereto, said first mold portion having a first opposing mold face with a cavity therein corresponding to the shape of said object to be molded, said second mold portion having a second opposing mold face with a core thereon corresponding to the back of said object to be molded, the opposing mold faces of said first mold portion and said second mold portion upon mating, defining a void therebetween, said void corresponding in size and shape to the object to be molded, said void being connected by a first channel to a first orifice for providing resin therein, said void further being associated with a second channel extending to a second orifice on the outer surface of said mold, said second channel and orifice being of sufficient size and shape for removing air from said void, said first mold portion and said second mold portion having opposing members of a resilient interlocking pair on opposing mold faces, respectively, said interlocking pair members circumscribing said core and said cavity on said opposing mold faces, and when interlocked, forming a resilient and self-locking mold having a void that when subjected to reduced pressure, is resistant to air seepage during molding conditions, and when said void is filled with liquid resin, are capable of holding said first and second mold portions of said self-locking mold together, without the application of external force until said liquid resin in said void has hardened into said molded object.

2. The mold of claim 1 wherein said opposing members of said resilient interlocking pair are a resilient ring and a corresponding resilient recess, said resilient recess being of sufficient size and shape to releasably interlock with said resilient ring.

3. The mold of claim 2 wherein said first mold portion and said second mold portion are composed of a resilient silicone rubber.

4. The mold of claim 3 wherein said ring is an integral part of said first mold portion or said second mold portion.

5. The mold of claim 4 wherein said ring has a cross-sectional shape that is a member of the group consisting of a circle, an oval, an ellipse, an octagon, a hexagon, a pentagon, a diamond on point, a triangle on point and combinations thereof.

6. The mold of claim 5 further containing a vacuum chamber in communication with said second channel and said void and capable of receiving excess liquid resin introduced into said void.

7. An improved two piece silicone mold for prototype molding of the type having a first mold portion and a second mold portion, the first mold portion having a first opposing mold face with a cavity thereon corresponding to the front face of an object to be molded, the second mold portion having a second opposing mold face with a core thereon corresponding to the backside of the object to be molded, the opposing faces when held together, defining a void therebetween that corresponds in size, shape and thickness to the object to be molded, said void capable of retaining liquid resin therein, for so long as an external device compresses said opposing mold faces against one another, the improvement comprising said opposing mold faces having thereon opposing members of a resilient interlocking pair that are a circumscribing ring and a corresponding recess, that when interlocked, form a resilient and self-locking mold having a void that is resistant to air seepage when subjected to reduced pressure during molding conditions and when said void is filled with liquid resin, is capable of holding the first and second mold portions together without external compression until said liquid resin hardens into said molded object.

8. In the improved mold of claim 7, said resilient interlocking pair comprising a ring or a recess surrounding said cavity on said first opposing face and a recess or a ring, respectively, surrounding said core on said second opposing face, said recess being of sufficient size, shape and position to snugly and reversibly interlock with said ring.

9. In the improved mold of claim 8, said ring being made of the same material as the opposing face to which it is attached.

10. In the improved mold of claim 9, said ring having a cross-sectional shape that is a member of the group consisting of a circle, an oval, an ellipse, an octagon, a hexagon, a pentagon, a triangle on point, a diamond on point and combinations thereof.

11. In the improved mold of claim 10, said ring being attached along its length to said mold face by a neck.

12. In the improved mold of claim 11, said ring being integrally attached along its length to said mold face by said neck.

* * * * *